United States Patent
Chéné et al.

(10) Patent No.: US 7,774,504 B2
(45) Date of Patent: Aug. 10, 2010

(54) POLICY-DRIVEN MOBILE FORMS APPLICATIONS

(75) Inventors: Marc Chéné, Ottawa (CA); Liam Peyton, Ottawa (CA); Kevin McGuire, Ottawa (CA)

(73) Assignee: TrueContext Corporation, Kanata, ON (CA)

( * ) Notice: Subject to any disclaimer, the term of this patent is extended or adjusted under 35 U.S.C. 154(b) by 737 days.

(21) Appl. No.: 11/335,898

(22) Filed: Jan. 19, 2006

(65) Prior Publication Data

US 2006/0161646 A1 Jul. 20, 2006

Related U.S. Application Data

(60) Provisional application No. 60/645,199, filed on Jan. 19, 2005.

(51) Int. Cl.
G06F 15/16 (2006.01)

(52) U.S. Cl. .................... 709/246; 709/201; 709/217; 709/219; 709/245; 705/26; 705/35; 705/51; 717/101; 717/102; 717/103; 715/500; 715/505; 715/506; 715/513

(58) Field of Classification Search ......... 709/201–203, 709/227–229, 217–219, 245–246; 705/26–51; 715/500–513, 223, 234, 239; 717/101–103
See application file for complete search history.

(56) References Cited

U.S. PATENT DOCUMENTS

| | | |
|---|---|---|
| 5,054,096 A | 10/1991 | Beizer |
| 5,513,332 A | 4/1996 | Wimer et al. |
| 5,664,207 A * | 9/1997 | Crumpler et al. ............ 715/229 |

(Continued)

FOREIGN PATENT DOCUMENTS

JP 2004094735 A * 3/2004

(Continued)

OTHER PUBLICATIONS

Forensic handwritten document retrieval system Srihari, S.N.; Shi, Z.; Document Image Analysis for Libraries, 2004. Proceedings. First International Workshop on 2004 pp. 188-194 Digital Object Identifier 10.1109/DIAL.2004.1263248.*

(Continued)

*Primary Examiner*—Wing F Chan
*Assistant Examiner*—Razu A Miah
(74) *Attorney, Agent, or Firm*—Nixon Peabody LLP

(57) ABSTRACT

A system for capturing data via an extensible markup language form is disclosed comprising a policy-based mobile content engine, a mobile-forms application client, and a transport engine. The policy-based mobile content engine is adapted to process a plurality of definitions from one or more mobile-forms application definition files. The policy-based mobile content engine translates the mobile-forms application definitions into policies and actions enforced by the policy-based mobile content engine. The mobile-forms application client has a plurality of rendering engines targeted for a mobile user device to render form controls and to process the forms-based application. The mobile-forms application client is operable on a mobile user device and is adapted to capture the data as an extensible-markup-language document. The transport engine is adapted to transport the mobile-forms application definition files and captured data through a transport layer between the policy-based mobile content engine and the mobile-forms application client.

33 Claims, 4 Drawing Sheets

U.S. PATENT DOCUMENTS

| | | | |
|---|---|---|---|
| 5,675,743 A | 10/1997 | Mavity | |
| 5,680,548 A | 10/1997 | Trugman | |
| 5,801,689 A | 9/1998 | Huntsman | |
| 5,812,857 A | 9/1998 | Nelson et al. | |
| 5,819,274 A | 10/1998 | Jackson, Jr. | |
| 5,884,317 A | 3/1999 | Cline et al. | |
| 5,887,141 A | 3/1999 | Trugman | |
| 5,926,637 A | 7/1999 | Cline et al. | |
| 5,937,198 A | 8/1999 | Nelson et al. | |
| 5,949,412 A | 9/1999 | Huntsman | |
| 5,960,421 A | 9/1999 | Cline et al. | |
| 6,006,229 A | 12/1999 | Schmidt et al. | |
| 6,006,277 A | 12/1999 | Talati et al. | |
| 6,070,199 A | 5/2000 | Axtman et al. | |
| 6,115,744 A | 9/2000 | Robins et al. | |
| 6,119,167 A | 9/2000 | Boyle et al. | |
| 6,128,742 A | 10/2000 | Felt | |
| 6,216,151 B1 | 4/2001 | Antoun | |
| 6,230,190 B1 | 5/2001 | Edmonds et al. | |
| 6,233,608 B1 | 5/2001 | Laursen et al. | |
| 6,236,999 B1 | 5/2001 | Jacobs et al. | |
| 6,243,676 B1 | 6/2001 | Witteman | |
| 6,247,048 B1 | 6/2001 | Greer et al. | |
| 6,253,257 B1 | 6/2001 | Dundon | |
| 6,288,718 B1 | 9/2001 | Laursen et al. | |
| 6,289,212 B1 | 9/2001 | Stein et al. | |
| 6,292,657 B1 | 9/2001 | Laursen et al. | |
| 6,292,833 B1 | 9/2001 | Liao et al. | |
| 6,301,471 B1 | 10/2001 | Dahm et al. | |
| 6,301,474 B1 | 10/2001 | Hartmaier et al. | |
| 6,304,746 B1 | 10/2001 | Fascenda et al. | |
| 6,304,753 B1 | 10/2001 | Hartmaier | |
| 6,304,881 B1 | 10/2001 | Halim et al. | |
| 6,314,108 B1 | 11/2001 | Ramasubramani et al. | |
| 6,317,594 B1 | 11/2001 | Gossman et al. | |
| 6,317,831 B1 | 11/2001 | King | |
| 6,330,568 B1 | 12/2001 | Boothby et al. | |
| 6,341,270 B1 | 1/2002 | Esposito et al. | |
| 6,341,316 B1 | 1/2002 | Kloba et al. | |
| 6,347,095 B1 | 2/2002 | Tang et al. | |
| 6,353,839 B1 | 3/2002 | King et al. | |
| 6,356,964 B1 | 3/2002 | Mohindra et al. | |
| 6,360,252 B1 | 3/2002 | Rudy et al. | |
| 6,360,279 B1 | 3/2002 | Woods et al. | |
| 6,363,419 B1 | 3/2002 | Martin, Jr. et al. | |
| 6,370,518 B1 | 4/2002 | Payne et al. | |
| 6,385,643 B1 | 5/2002 | Jacobs et al. | |
| 6,393,269 B1 | 5/2002 | Hartmaier et al. | |
| 6,397,345 B1 | 5/2002 | Edmonds et al. | |
| 6,400,754 B2 | 6/2002 | Fleming et al. | |
| 6,405,037 B1 | 6/2002 | Rossmann | |
| 6,697,839 B2* | 2/2004 | Sini et al. | 709/203 |
| 7,313,757 B2* | 12/2007 | Bradley et al. | 715/234 |
| 2001/0041556 A1 | 11/2001 | Laursen et al. | |
| 2001/0051979 A1 | 12/2001 | Aufricht et al. | |
| 2002/0016813 A1 | 2/2002 | Woods et al. | |
| 2002/0023173 A1 | 2/2002 | Jacobs et al. | |
| 2002/0032722 A1 | 3/2002 | Baynes, Jr. et al. | |
| 2002/0032750 A1 | 3/2002 | Kanefsky | |
| 2002/0035605 A1 | 3/2002 | McDowell et al. | |
| 2002/0035699 A1 | 3/2002 | Crosbie | |
| 2002/0039882 A1 | 4/2002 | Ternullo et al. | |
| 2002/0039899 A1 | 4/2002 | Rossman | |
| 2002/0042831 A1 | 4/2002 | Capone et al. | 709/230 |
| 2002/0046299 A1 | 4/2002 | Lefeber et al. | |
| 2002/0049069 A1 | 4/2002 | Johnson | |
| 2002/0049905 A1 | 4/2002 | Deo et al. | |
| 2002/0052207 A1 | 5/2002 | Hunzinger | |
| 2002/0052674 A1 | 5/2002 | Chang et al. | |
| 2002/0052781 A1 | 5/2002 | Aufricht et al. | |
| 2002/0052916 A1 | 5/2002 | Kloba et al. | |
| 2002/0055917 A1 | 5/2002 | Muraca | |
| 2002/0059256 A1 | 5/2002 | Halim et al. | |
| 2002/0059459 A1 | 5/2002 | Koka et al. | |
| 2002/0069263 A1 | 6/2002 | Sears et al. | |
| 2002/0073163 A1 | 6/2002 | Churchill et al. | 709/214 |
| 2002/0073196 A1 | 6/2002 | Westervelt et al. | |
| 2002/0086661 A1* | 7/2002 | Rouse et al. | 455/412 |
| 2002/0114341 A1 | 8/2002 | Sutherland et al. | |
| 2002/0120846 A1* | 8/2002 | Stewart et al. | 713/168 |
| 2002/0194219 A1 | 12/2002 | Bradley et al. | |
| 2003/0032409 A1 | 2/2003 | Hutcheson | |
| 2003/0139174 A1 | 7/2003 | Rao | |
| 2003/0220879 A1* | 11/2003 | Gaughan et al. | 705/51 |
| 2003/0229846 A1* | 12/2003 | Sethi et al. | 715/500 |
| 2004/0003341 A1 | 1/2004 | alSafadi et al. | |
| 2004/0128342 A1 | 7/2004 | Maes et al. | |
| 2005/0005259 A1* | 1/2005 | Avery et al. | 717/103 |
| 2005/0130628 A1* | 6/2005 | Zom et al. | 455/412.1 |
| 2005/0254440 A1* | 11/2005 | Sorrell | 370/264 |
| 2006/0170968 A1* | 8/2006 | Maki et al. | 358/1.15 |
| 2007/0136361 A1* | 6/2007 | Lee et al. | 707/102 |
| 2009/0182717 A1* | 7/2009 | Zilberfayn et al. | 707/3 |

FOREIGN PATENT DOCUMENTS

| | | | |
|---|---|---|---|
| JP | 2007087021 A * | 4/2007 | |
| WO | WO 97/43717 | 11/1997 | |
| WO | WO 01/52496 | 7/2001 | |
| WO | WO 01/61517 | 8/2001 | |

OTHER PUBLICATIONS

International Search Report, dated Jun. 12, 2006.
Written Opinion of the International Searching Authority, dated Jun. 12, 2006.
UMTS: A Middleware Architecture and Mobile API Approach, 7 pages, Birgit Kreller, Anthony Sang-Bum Park, Jens Meggers, Gunnar Forsgren, Erno Kovacs, Michael Rosinus, © 1998 IEEE.
International Search Report, Application No. PCT/IB03/03045, dated Nov. 24, 2003.
International Search Report dated May 25, 2005.
International Search Report dated May 26, 2005.
International Search Report and Opinion dated Jun. 2, 2006.
"4$^{th}$pass Delivers Free Java Bytecode Obfuscator to JavaLobby," Java Industry Connection™, java.sun.com, May 6, 1999, 2 pages.
4thpass Dynamic Provisioning, www.4thpass.com/solutions/index. html, Apr. 16, 2002, 16 pages.
Gutzman, Alexis, "The Who, What and Why of WAP," ecommerce-guide.com®, http://ecommerce.internet.com/news/insights/ectech/article/0,,9561_381271,00.html, May 26, 2000, 4 pages.
IEC: Wireless Application Protocol (WAP), International Engineering Consortium, http://www.ieg.org/online/tutorials, copyright 2002, 10 pages.
Java Develper's Journal, http://www.sys-con.com, May 20, 2002, 4 pages.
Symbian Technology, http://www.symbian.com, Mar. 2002, 39 pages.
TrueContext—collaboration for the wireless value chain, http://www.truecontext.com, Feb. 27, 2002, 28 pages.
Zuvix Technology, http://211.174.63.103, May 20, 2002, 2 pages.
International Search Report; dated Jun. 17, 2005.
International Search Report dated Jun. 14, 2005.
PureEdge™ 8χ Online 2004, XP002331830 Retrieved from the Internet: URL: http://www.pureedge.com/products/products/ProductBrochure.pdf on Jun. 10, 2005 (4 pages).
alphaWorks: IBM forms for Mobile Devices: Overview, Online Dec. 10, 2004, XP002331639 Retrieved from the Internet: URL:http://www.alphaworks.ibm.com/tech/ifmd on Jun. 8, 2005 one page.
Rischpater: Create Mobile Applications with IBM Forms for Mobile Devices Online 2005, XP002331471 Retrieved from the Internet: URL:http://www.devx.com/wireless/Article/27871/1954?pf=true on Jun. 8, 2005 (2 pages).

XFormation Datasheet Online 2004, XP002331472 Retrieved from the Internet: URL:http;//www.xformation.com/PDF/XFormation%201SE%20Detailed%20Sheet.zip on Jun. 9, 2005 (3 pages).

Honkola et al.: A Device Independent XML User Agent for Multimedia Terminals Proceedings of the IEEE Sixth International Symposium on Multimedia Software Engineering (ISME 04) Dec. 13, 2004, XP010757237 ISBN: 0-7695-2217-3 (8 pages).

Novell and XForms Technology Online 2005, XP 002331482, Retrieved from the Internet: URL:http://developer.novell.com/xforms/ on Jun. 10, 2005 (2 pages).

Dubinko: XForms Essentials Online Aug. 26, 2003, O'Reilly US, XP002331484, Retrieved from the Internet: URL:http://xformsinstitute.cm/essentials/browse/ch11.php on Jun. 8, 2005, chapter 11 (6 pages).

* cited by examiner

POLICY-DRIVEN MOBILE FORMS APPLICATIONS

CROSS REFERENCE TO RELATED APPLICATIONS

This application claims priority to U.S. provisional application Ser. No. 60/645,199, filed on Jan. 19, 2005. The disclosure of the aforementioned provisional application is incorporated by reference in its entirety herein.

FIELD OF THE INVENTION

The present invention relates generally to content management and, more particularly, to a system and method for defining, deploying, and managing mobile forms applications, in a multi-tenant (multi-domain) hosted environment, that can display and capture data on a wide variety of mobile devices in the context of a business workflow routed through a wide variety of intermittently connected networks both inside and outside of corporate firewalls.

BACKGROUND OF THE INVENTION

Today, most data in field force industries (e.g., field sales, field services, inspection and reporting, etc.) is distributed and captured on paper-based forms. The data entered on paper-based forms are typically returned to the business office to be manually entered electronically and integrated with a back office system. Furthermore, an enterprise business process might require the captured data to be reviewed by other members of the organization (e.g., authorization, up sell opportunity, billing, etc.) before, during, or after the field has interacted with the data. The process of distributing, updating, capturing, and returning form data and adapting it to a unique business process applies to a large number of mobile workers performing a variety of tasks such as, but not limited to, inspections (e.g., property, health, etc.), sales force reporting, and work order dispatches (e.g., HVAC, insurance claims, etc.).

Typically, in more complex forms-based business processes, work requests and form data are initially dispatched to field force workers using a voice channel (e.g., cell phone) or pre-printed paper forms (e.g., clipboard) that is then manually filled out or updated by the mobile worker (e.g., technician). A completed work request might also require one or many subsequent requests (e.g., required parts, required authorization, up-sell opportunities, etc.) that are typically done through a call over a cellular phone, or return trip to the office, or may cause the displacement of the mobile worker. Today, field inspectors may also capture data in the field using a series of paper forms and binders to complete their inspection tasks, resulting in a slow and inefficient process.

Businesses incur high wireless voice and vehicle fleet costs due to the above-described processes used in dispatching field workers, capturing or updating form data, and completing work orders or inspection forms in the field. Additionally, there are significant cost and inefficiencies with slow, manual processes for the exchange of data using paper-based forms, from the cost of the paper based forms, to duplicate data entry, to errors made in data capture on paper, to waiting for the person with the data to update another person or system, etc.

Electronic forms and XForms (XML Forms) solutions (such as, Adobe LiveCycle, Microsoft Infopath, FormDocs, Altova, Advantys, MDSI, X-Smiles, formsPlayer, and Novell XForms) are generally PC-centric and Local Area Network (LAN) oriented as opposed to being optimized for mobile devices and wireless use. Additionally, these solutions are on-line and browser-centric, as opposed to being optimized for on- and off-line use over intermittently connected wireless networks with varying degrees of cost and quality of service. These solutions typically do not provide mechanisms for hosting multi-tenants (multi-domain) forms applications using a common IT infrastructure (e.g., Managed Service Provider hosted environment), nor do they have support for sophisticated routing and tracking of forms and policies that define a mobile forms application.

Therefore, it would be desirable to have a system and method for defining, deploying, displaying, modifying, capturing, validating, and submitting/returning form data on mobile device using an intermittent network connection that addresses one or more of these issues.

SUMMARY OF THE INVENTION

According to one embodiment of the present invention, a system for capturing data via an extensible markup language form is disclosed. The system comprises a policy-based mobile content engine, a mobile-forms application client, and a transport engine. The policy-based mobile content engine is adapted to process a plurality of mobile-forms application definitions from one or more mobile-forms application definition files. The policy-based mobile content engine is adapted to translate the plurality of mobile-forms application definitions into policies and actions. The policy-based mobile content engine is adapted to enforce the policies and actions that have been translated. The mobile-forms application client has a plurality of rendering engines targeted for one or more mobile user device. The rendering engines utilize a forms application definition markup language to render form controls and to process the forms-based application. The mobile-forms application client is operable on the one or more mobile user device and is adapted to capture the data both online or offline as an extensible-markup-language document. The transport engine is adapted to transport the mobile-forms application definition files and captured data through a transport layer between the policy-based mobile content engine and the mobile-forms application client.

According to another embodiment of the present invention, a method for defining and enforcing routing rules to define a business process workflow is disclosed. The method comprises the act of defining, via a mobile-forms application designer, a mobile-forms application-definition file that defines a mobile forms application by providing, (i) a mobile forms application definition markup language, (ii) an extensible-markup-language-based policy model that applies to one or more data instances that are to be captured, (iii) routing information specifying one or more targeted mobile user devices to deploy the mobile-forms application-definition file to, and (iv) a means of distribution of the forms-based application to targeted mobile users devices. The method further comprises the act of determining the routing rules for the business process workflow by reading, via a business process engine proxy, the mobile-forms application-definition file for the specified routing information and associated extensible-markup-language-based policy model. The method further comprises the act of enforcing, via a policy-based content management engine, the routing rules determined based on the defined and read mobile-forms application-definition file. The deployment, form interaction, routing, and management of the mobile forms application is automatically supported by reading, deploying, and enforcing the mobile-forms application-definition file.

According to yet another embodiment of the present invention, a method for recognizing data superimposed on a paper form is disclosed. The method comprises the act of scanning a paper based form to create a paper-based form template. The method further comprises the act of capturing the location of a form data instance element overlaid on the paper-based form template. The method further comprises the act of capturing the size of a form data instance element overlaid on the paper-based form template. The method further comprises the act of creating an input field based on the location and size of the form data instance element. The method further comprises the act of linking the paper-based form template to an application data model. The method further comprises the act of populating the paper-based form template with mobile-forms application data for a specific data instance in the input field.

The above summary of the present invention is not intended to represent each embodiment, or every aspect, of the present invention. Additional features and benefits of the present invention are apparent from the detailed description, figures, and claims set forth below.

Figure 1:
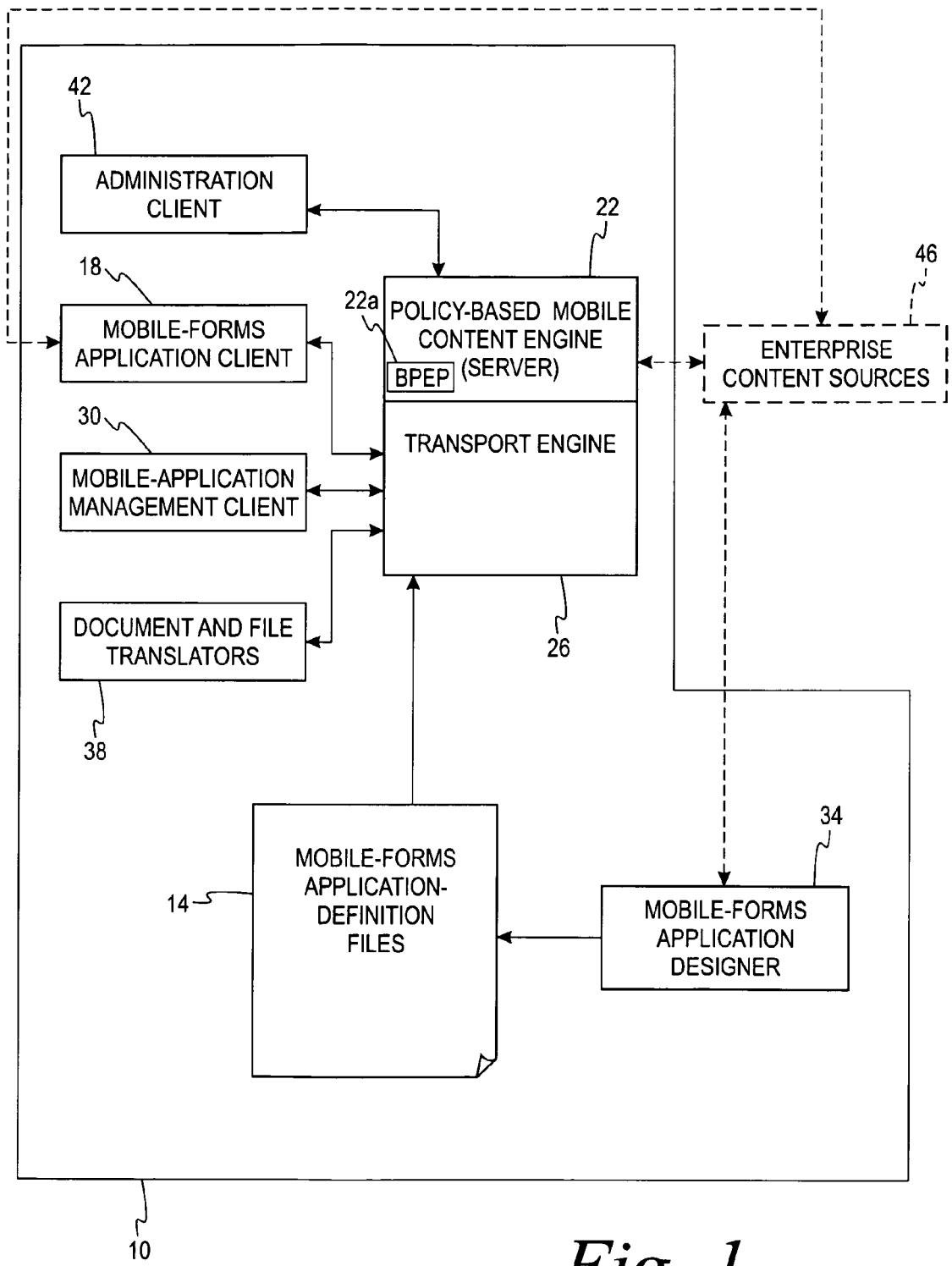
FIG. 1 is an illustration of a content management system for mobile forms applications, according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

According to one embodiment of the present invention, the content management system for mobile forms applications enables organizations to define and deploy mobile applications, forms, and business process workflow to mobile users across an enterprise or by using a Managed Service Provider (MSP) hosted environment. The content management system for mobile forms applications can be utilized without any programming language code being written or scripted since it is defined by policies, wizards, templates, and XML models. The content management system for mobile forms applications provides secure centralized control and support for hosting multiple security domains, while addressing all the complications of mobility (access outside the firewall, intermittently connected, wide variety of mobile devices and networks of varying capabilities, integration with existing business processes, IT infrastructure, etc.).

The content management system defines a mobile-forms-application definition model and associated tools for: (1) defining XML-based applications, forms, and business process workflow that are optimized for mobility; (2) for interacting with XML data in a mobile forms application instance with model-driven, mobile-device-optimized forms; (3) structuring and defining—with model-driven policies—the process for delivering, storing, managing, notifying and routing XML forms and associated form content (data, voice notes, photographs, sketches, GPS/location data, external data inputs—e.g., bar-code scanners, etc.) to and from users and systems for mobile forms applications; (4) managing and monitoring—with device-optimized interfaces—the status of XML mobile forms applications and all its instances, including support for on and off-line use; and (5) document-based translation of XML to and from a wide variety of forms for importing, exporting, transforming, and publishing the data and content associated with an instance of a XML mobile forms application.

The content management system for mobile forms applications leverages several XML standards and will be compatible with emerging XML standards in the area of business process management. However, the content management system for mobile forms applications provides innovation beyond what is defined in XML and XForms standards by addressing unique challenges presented by wireless and mobility (users, devices, networks, cost of service, quality of service, etc.). The content management system for mobile forms applications provides an automated, model-driven visual framework for the deployment and life-cycle management of mobile forms applications, and the processes associated with them (real-time and near-real time integration with structured and unstructured enterprise applications and content sources, configurable and dynamic notifications and alerts, routing of content, applications, and form data to and from mobile devices automatically or manually, etc.).

The policy-driven mobile forms applications have been designed and optimized for: (1) deployment and operation within an Enterprise or a hosted MSP environment for Enterprises (multi-tenant or multi-domain); (2) support for multiple types of OS-enabled PCs and mobile devices (beyond a PC/Laptop, including but not limited to Smartphones, PDAs, Handhelds, Tablet PCs, Handsets, Browser-based devices, Portable and Embedded terminals, etc.); (3) use behind the enterprise firewall (e.g. LAN, Wireless LAN, cradle) and while in the field (e.g., on/off-line, asynchronous mobile wireless network connections, Wide-Area Wireless connection, etc.); (4) use by non-technical users within every "role" (form design, business process owner, end-user, administrators, etc.) and Small and Medium Sized Enterprises (SME's) as opposed to technical-users in enterprise IT departments and Large Enterprise Deployments; and (5) use without requiring extensive IT components needing to already be in place (e.g., middleware, enterprise content management, document and records management systems, databases, web servers, etc.).

Turning now to the drawings, FIG. 1 illustrates a content management system for mobile forms applications 10, according to one embodiment of the present invention. The content management system for mobile forms applications 10 includes eight main components: a plurality of mobile-forms application definition files 14; a mobile-forms application client 18; a policy-based mobile content engine (server) 22; a transport engine 26; a mobile-application management client 30; a mobile-forms application designer 34; a plurality of translators 38; and an administration client 42.

The mobile-forms application definition files 14, according to one embodiment, are specified in XML-based forms application definition markup language based on the W3C XForms specification to define a rich presentation of forms rendered in a Graphical User Interface (GUI) by the mobile forms application thick or thin-Client. Some enhancements have been made to extend the XForms schema to make it more efficient for mobile forms applications, as well as to support layout of form controls on mobile devices, and integrating routing of forms between users in a mobile forms application. An XML-based policy model is utilized by the mobile-forms application definition files 14 to define application and form states, workflow, validations, conditions, and actions to be processed for the life cycle of a new or updated form data instance. The policy model defines how the form data is managed (e.g., transformation and validation of data, publication of data to targeted resources, publication of data based on the type network connection, notifications and alerts to users based on form actions and events, etc.) and distributed, as well as to whom (people, systems, resources, etc.) it is distributed.

As discussed above, the mobile extensible forms markup language (mXForms) used in the mobile-forms application-definition files 14 is based on the XForms W3C recommendation (which can be found at http://www.w3.org/TR/2003/REC-xforms-20031014/). This mXForms markup language defines how to render rich GUIs online or offline for mobile devices, and display, update and captures data. mXForms and XForms distinctly define the presentation definition (look and feel), the format of the data captured, form controls, and the behavior of the forms-based application (e.g., data validation, navigation, workflow, actions, etc.). It is a language that can fully leverage the limited display and functionality (including native and external peripherals—e.g., barcode scanner, GPS module, etc.) of some of the targeted mobile devices. Multiple views or mobile forms applications may be required to complete the data capture of a forms-based application, including support for contextual (e.g., dynamic) views or interaction with the form (e.g., Y happens only if the user has selected X in the form). Unique form controls are also needed to display, add, edit, and delete repeating line items on such limited devices. The markup language also affords for creation of unique form controls that future business processes may require. These multiple views and form controls can be used on- or off-line, via thin/thick clients on mobile devices that are OS-enabled.

The mobile-forms application client 18 includes a plurality of rendering engines targeted for each Operating System (OS) enabled mobile device or browser enabled device that can be used as a thick and thin client. The rendering engines use the XML-based forms application definition markup language to render a rich set of GUI form controls and to process the corresponding behavior of the forms-based application for the end-user. The rendering engines are adapted to create a fully configurable look and/or feel for the end-user. Furthermore, the mobile-forms application client 18 is capable of displaying (read-only or read/write), updating, and capturing the end-user's inputted data on- or off-line as one or more XML documents, as well as attachment files and managed lists that may be in a format other than XML.

The mobile-forms application client 18 is also able to display, update, capture and attach a wide variety of multi-media content to the form data. Alternatively or additionally, the rendering engines are adapted to encode this data to the XML form data instance as a base64 encoded element or reference the inputted text or binary file as a separate entity. The form data may include, for example, signatures, photos, voice notes, sketches, global positioning information, GoogleMaps, bar code scanning information, automobile monitoring information, etc.

For example, the mobile-forms application client 18 can call and control (interchange data) with an enabled device's Global Positioning System (GPS) coordinates to feed this information (as part of an XML form data instance or data blob) to the policy-based mobile content engine 22 (or to a forms solution). This data may then be used to assist in device management—adding business value by allowing a user to, for example, locate a lost device or assist in locating and dispatching a desired field worker to a specific job. Additionally, GPS coordinates may be dispatched along with a work order to allow a field worker to utilize a mapping tool (e.g., GoogleMaps, MapPoint Location Server, etc.) to find the directions to the site for the work order. The mobile-forms application client 18 can pass this data to feed a mobile device application. For example, if the address of a dispatched work order is known, the mobile-forms application client 18 can pass this data to Microsoft PocketStreets and launch the application so the field worker can see the mapped address of their next work order. According to one embodiment, the bar code scanning information can be mapped to an input field within a form, or may be used to extract information from an external data source (e.g., a managed list, etc.). For example, the bar code information may represent a part number that can then be searched through a part list to extract the part's name, description, price, etc.

The content used by the mobile-forms application client 18 can either be embedded within the XML form data (base64 encoded) or be referenced and managed as attachment files in a very elegant way as content under the control of policies that control how the content is managed and distributed (e.g., don't force sending of large multimedia files associated with the form when the form is submitted wirelessly—unlike other database/sync or real-time forms solutions). The mobile-forms application client 18 can support a wide variety of technologies and input devices (e.g., Personal Digital Assistants (PDAs), smartphones, etc.) for data capture and form navigation. The input devices are linked to and interact with controls defined in the mobile extensible forms markup language to provide and enable data capture and form navigation.

By way of example, the mobile-forms application client 18, via the defined controls, are adapted to support a plurality of input devices, such as: keyboards (e.g., PC keyboard, keypad, Simple Input Panel (SIP), soft-keyboard, etc.); navigation, mouse, and I/O devices (e.g., optical mouse, RS-232 standard modules, touch-screens, scroll wheels, USB memory dongles, hard-drives, etc.); writing instruments and pointers (e.g., stylus, electronic pen/ink, handwriting to text conversion apps, etc.); audio (e.g., speech to text recognition, speech used the selection of an item from a list, speech used for form navigation using technology such as VRML, voice recorders, etc.); infrared reader; magnetic reader and cards (e.g., swipe card, proximity card, smart card, expandable media cards and storage devices such as, for example, SD, MMC, compact flash, memory stick, etc.); Radio Frequency Identification (RFID); external or internal device peripheral (e.g., GPS, environmental meter, printers, etc.) including devices or data monitoring and reporting modules within an automobile (e.g., telematics); external or internal applications (e.g., VoIP softphone software, GPS software, etc.); scanners (e.g., optical character reader (OCR), bar code, biometric, etc.); incoming messages (e.g., via SMS, Smart Messages, OMA, SyncML, Email, SNMP, Active Sync, SMPP, SMTP, RSS/XML, etc.); and camera and digital imaging tools and devices.

The policy-based mobile content engine 22 includes a Business Process Engine Proxy (BPEP) 22a that processes mobile forms application definitions from the mobile-forms application definition files 14 and translates the application definitions into folder structures, files, and security roles as well as policies and actions that the policy-based mobile content engine 22 enforces. These policies and actions are utilized by the policy-based mobile content engine 22 to guide each instance of a mobile form through the business workflow process, including but not limited to, routing the form to different users and sending out notifications as the data fields of the mobile form are updated and actions are taken. The BPEP 22*a* uses the policy model (application data model, process states, user groups, folder structure, workflow, actions, conditions, etc.) defined in the mobile-forms application definition files 14. The policy model is extensible, flexible, visual, and may be wizard driven. As such, the policy model may be designed to be used and interacted with by non-technical users. Note that a mobile forms application is created by the BPEP 22*a* into a single security domain. The policy-based mobile content engine 22 explicitly represents the concept of multiple tenants (multiple domains) in its internal structures and partitions the content management, security roles, authorization, and policies associated with a mobile forms application by tenant (domain).

The transport engine 26 is an integrated client/server transport engine that is adapted to reliably transport (e.g., form data instance integrity and auditing of actions on the policy-driven mobile content engine 22 and mobile user device) the XML mobile application, forms data, and content through a configured transport layer (e.g., HTTP/HTTP(S), SynchML, ActiveSync, SOAP, FTP, SMTP, SMPP, RMI, IIOP, etc.) between the policy-based mobile content engine 22 and the mobile-forms application client 18. The transport engine 26 is optimized for mobility in regards to support for on- and off-line use, support for multiple OS-enabled mobile devices, support for various wireless and mobile networks with detection, consideration and management for their various cost and quality of services, etc. Compression, byte differencing, and network policies (e.g., do not send large attachments when low bandwidth connection) are used to provide intelligent use of bandwidth. File caching, robust session management, partial file transmission support, and a robust synchronization protocol over HTTP are provided to address network unreliability.

The policy-based mobile content engine 22 addresses the challenges (limited and unique physical attributes, cost of service, quality of service, etc.) associated with wireless and mobile devices and networks through the use of network policies in conjunction with the transport engine 26. The transport engine 26 determines whether data compression should be used to minimize data transmitted over the transport layer as well as a number of other techniques (use right network at the right time, compression, byte-level differencing, check-point restart, caching and queuing of requests, automatic and manual client/server interactions, etc.)

The mobile-application management client 30 is made available on each Operating System (OS) enabled mobile device or browser enabled device that can be used as a thick and thin client. The mobile-application management client 30 allows a manager or dispatcher to create, view, edit, assign, sort, search, or track the progress of form data for any given mobile forms application. The mobile-application management client 30 allows such functionality based on the information in the mobile-forms application-definition files 14. The mobile-forms application-definition files 14 map special "search fields" to information in a mobile form, including the current owner, the current state, as well as allowing custom defined fields. The mobile-application management client 30 leverages the folder structure and policies generated by the BPEP 22*a*, to display to a person managing mobile forms applications (e.g., dispatcher, office administrator, etc.) all the instances of a mobile form application, currently in progress. Additionally, the manager can see what state the mobile form is in, who it is assigned to, if the field worker has installed the right data on their device, etc. The mobile-application management client 30 incorporates the same rendering engine used by the mobile-form application client 18, so that a manager can select any form instance to view or edit it or create a new one. The manager can use this to change the status of a form or assign it to a different person.

The mobile-forms application designer 34 is adapted to create the mobile-forms application definitions contained within the mobile-forms application definition files 14. In particular, the mobile-forms application designer 34 allows a non-technical designer (having minimal or no scripting, programming, or coding knowledge) to define an application in terms of: (i) the mobile forms application definition markup language; (ii) the XML-based policy model that applies to the captured data; (iii) the targeted OS-enabled mobile device (e.g., PCs, TabletPCs, Laptop, PDA, Smartphone, Handheld, Handset, Browser-enabled mobile device, etc.) or browser for the forms application definition; and (iv) the means of distribution of the forms-based application to targeted users (e.g., via push technology, SMTP, or available through a Uniform Resource Identifier (URI), etc.).

The mobile-forms application designer 34 is a simple Integrated Development Environment (IDE) for creating one or more mobile-forms application definition file 14. According to one embodiment of the current invention, the mobile-forms application designer 34 is a standalone PC-based application, but can also be an add-in to an existing application (e.g. Microsoft Visual Studio) or can be browser/web based. The data structure of the forms instance can be created by importing (e.g., via an enterprise content source) XML schema definitions or an instance of an XML file that is used as a demarcation point for back-end system integration. This includes flexible handling of version control and change propagation and data migration when refinements are made to the schema upon which a mobile forms application is based. The mobile-forms application designer 34 supports upgrades to a forms solution without disrupting the use of the forms solution by the field workers. Changes to the model shared between multiple participants are carefully migrated to the upgraded Data Instances (DIs) on the policy-based mobile content engine 22 transparently to the users of the forms solution. Version control on the DIs is important to understanding the data migration that needs to occur—possibly on the fly—at the time it is created and/or updated on the server by a field tech during the transition period until every field worker has the upgraded application/model on their user device.

The look and feel of the forms application is defined by the mobile-forms application designer 34. The form designer can create form-based applications using a rich set of form controls that can be dragged and dropped or defined on a single or multiple form view. The mobile-forms application designer 34 enables the use of drag and drop properties and other means and controls to define the form flow or navigation of the application. The form flow is how the user of the application can use a forms control (e.g., button, image, link, menu item, etc.) to modify forms. The form flow is mostly defined by an action added to a button. Conditional navigation can be controlled by the behavior typically defined by the "bind" property of the control or the parent container of the control.

The mobile-forms application designer 34 can associate actions to the form control to define the form flow.

The mobile-forms application designer 34 further defines a rich set of templates to speed the creation of or build forms (new or update forms) based application for specific OS-enabled targeted devices. This includes a translation service that helps with the automatic translation (and optimization) from a form optimized for one device into other devices (e.g., browser, laptop, etc.), as opposed to the user having to start from scratch for each device. The mobile-forms application designer 34 defines several wizards to simplify the steps to create, modify, copy, publish, test, etc. a forms based application and includes a test environment to process the authored mobile-forms application-definition files on the targeted device. Additionally, the mobile-forms application designer 34 provides workflow and form data validation, in one embodiment, through the search values and the predefined policies for a targeted participant for the workflow and the behavior as defined in XForms for validation.

The packaging of the forms application is provided by the mobile-forms application designer 34 as a simple installable application to any OS-enabled mobile devices (e.g., Windows NT/2000/XP/Tablet, Pocket PC, Win CE, etc.) or via a web-browser. The distribution of the forms application to system and non-system users via a BPEP 22a integrated with the policy-based mobile content engine 22 through push technology, SMTP, or a URI where the application can be downloaded, or rendered on the server and interacted with in a browser session.

The plurality of translators 38 are adapted to translate the mobile forms application instance data and content into a variety of formats (XML/HTML, PDF, SQL, CSV, Printers, Faxes, etc.) for further importing/exporting or for data manipulation, termination, or storage. A technique for form-based data superimposition recognition allows an author to define and automatically correlate the absolute positioning of form data, text, or image to be printed on a paper-based or electronic form template or layout.

A special design tool and document translator has been designed as part of this invention to facilitate the creation of a mobile forms application from existing paper-based forms. In typical paper-based processes, mobile workers collect data in paper forms that are faxed or printed. A mobile forms application also needs to use electronic data to print or fax a hard copy to the client on the same paper-based form. Existing print SDKs require absolute positioning of objects (e.g., text, images) in order to position and size the captured form data sent it to a local printer to be printed on a template paper-based form.

The paper form data superimposition recognition is a special design tool and document translator that can scan existing paper-forms to create a document template and then link it to the application data model—through simple drag and drop or definition of data controls via the mobile-forms application designer 34. The mobile forms application data for a specific application instance can then be used to populate the template that is ready for printing or faxing. The paper form data superimposition recognition allows a designer to automatically build a forms application for a given forms solution using a scanned version of an existing paper-based form. The model and DI can automatically be generated using the paper-based form. In some embodiments, the paper form data superimposition recognition requires the designer to: (1) review the form and change the input fields to other types of form controls (e.g., text box changed to a date picker or a signature control); (2) define groups of repeated line items; etc.

The administration client 42 is adapted to allow an end-user administrator to setup the rights provided to a specific user or device, the groups the user or device belongs to, the content available to the user or device, the domains the user or device is able to access, etc. The administration client 42 is particularly useful in embodiments where a number of company's content and forms are located on the same policy-based mobile content engine 22. The end-user administrator can then use the administration client 42 to allow access to the company's content only to, for example, company employees. The administration client 42 transmits access rights to the policy-based mobile content engine 22 that then can limit the access to the content based on the user or device information of the user device trying to access the various content.

Typically, when a mobile form application is developed utilizing the mobile-forms application designer 34, the user information, groups, and access rights are generated as well. However, as the access rights change over time, the end-user administrator can utilize the administration client 42 to adjust the access rights, users, or groups accordingly. This allows the end-user's IT department to manage their content and resources in a secure, desirable, and efficient manner.

One or more enterprise content sources 46 are in communication with the policy-based mobile content engine 22. The one or more enterprise content sources 46 may also communicate with the mobile-forms application designer 34 or the mobile-forms application client 18. The one or more enterprise content sources 46 are integrated directly with the policy-based mobile content engine 22, the mobile-forms application designer 34, and the mobile-forms application client 18 via a plurality of connectors.

The policy-based mobile content engine 22 can access the content and information stored on the one or more enterprise content sources 46 and transmit it to the various user devices based on the policies defined by the mobile-forms application-definition files 14. The mobile-forms application client 18 can utilize the one or more enterprise content sources 46 for pushing or receiving forms as XML files. Additionally, the mobile-forms application designer 34 can utilize the content contained with the one or more enterprise content sources 46 as a starting point for designing the mobile-forms application definition files 14.

Figure 2:
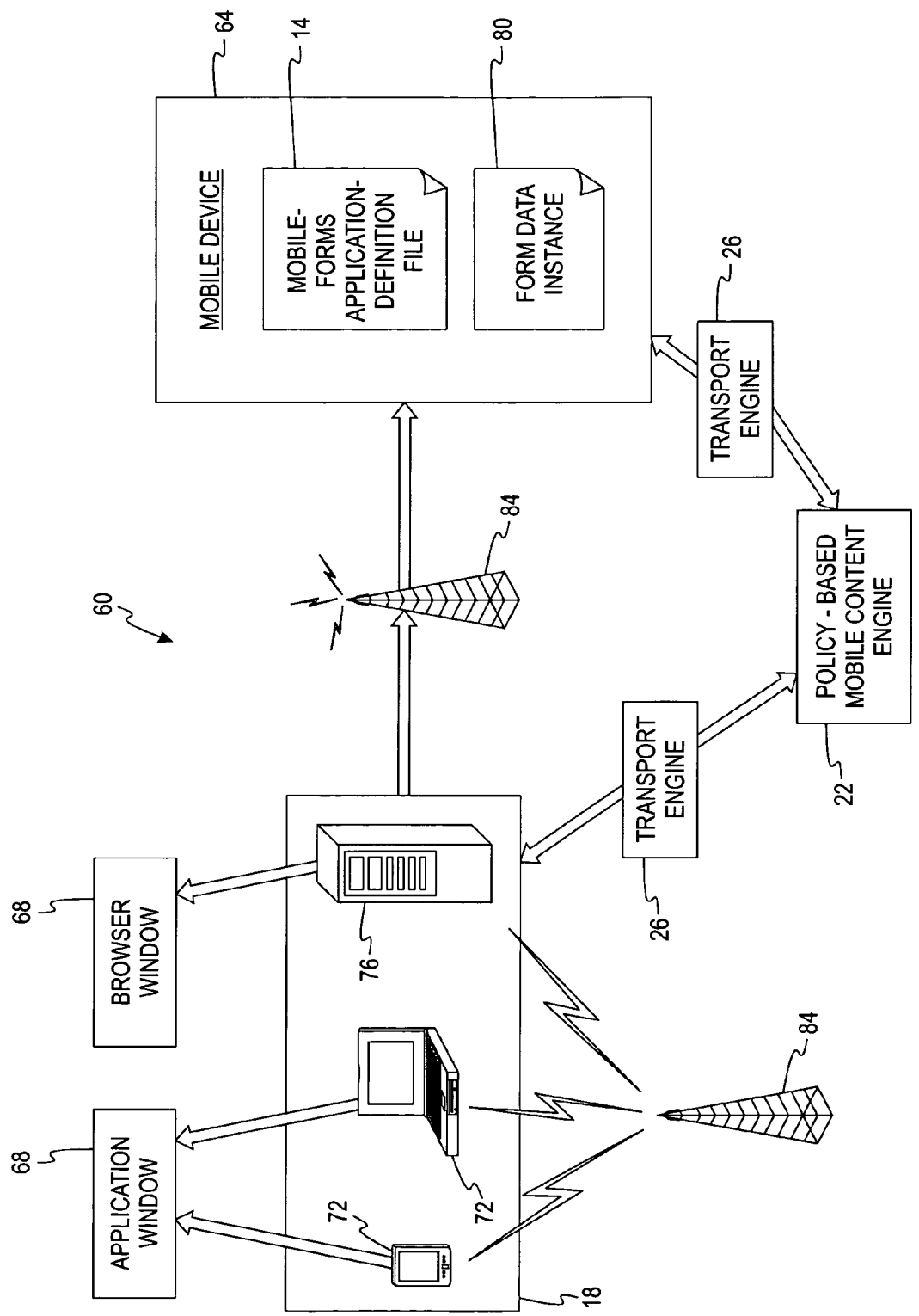
FIG. 2 is an illustration of a mobile-forms based content management network, according to one embodiment of the present invention.

Referring also to FIG. 2, a mobile-forms based content management network 60 is illustrated, according to one embodiment of the present invention. The content management network 60 allows the communication of the mobile-forms application client 18 with the policy-based mobile content engine 22 to transport the mobile-forms application-definition files 14 and all form data instances to and from a mobile device 64. The mobile-forms application client 18 is primarily comprised of a forms rendering engine that can present a user interface 68 as defined by in the mobile-forms application-definition files 14. The mobile-forms application-definition files 14 describe the user interface(s) 68 using the mobile extensible forms markup language that the forms rendering engine(s) interprets when displaying the user interface 68.

The mobile-forms application client 18 is available on a wide variety of OS-enabled mobile devices both as a native application 72 ("Thick Client") and as browser-enabled application 76 ("Thin Client"). It should be noted that even the browser-enabled applications are optimized to address the constraints of the devices they are operating on. The mobile-forms application client 18 communicates with the policy-based mobile content engine 22 via a client Application Programming Interface (API) to transport the mobile-forms application-definition files 14 and all form data instances 80 (associated XML data and content) to and from the mobile device.

As illustrated in FIG. 2, the policy-based mobile content engine 22, via the transport engine 26, delivers and receives the form data instances that are viewed and updated in the mobile-forms application client 18 (via the forms rendering engine) on a variety of devices 64, 72. Both "thick-client" 72 and "thin-client" 76 versions of the mobile-forms application client 18 leverage the transport engine 26 to communicate with the policy-based mobile content server 22 over intermittently connected networks 84 (sometimes online, sometimes offline). The communication consists mainly of delivering an instance of mobile form data, as well as mobile-forms application-definition files 14 to the mobile-forms application client 18 that determine how the mobile form data should be presented to the user. When the user updates the mobile form data instances 80, using the mobile-forms application client 18, they are communicated back to the policy-based mobile content engine 22 via the transport engine 26. Any changes to any instances are first persisted to a file prior to transporting them to the policy-base mobile content engine 22. This is done to ensure the user can safely keep working even if they are currently disconnected, to keep historical data on the device (if specified in the mobile forms application definition), and to provide a backup capability in case of device failure including but not limited to power failure such as no more battery power left.

Figure 3:
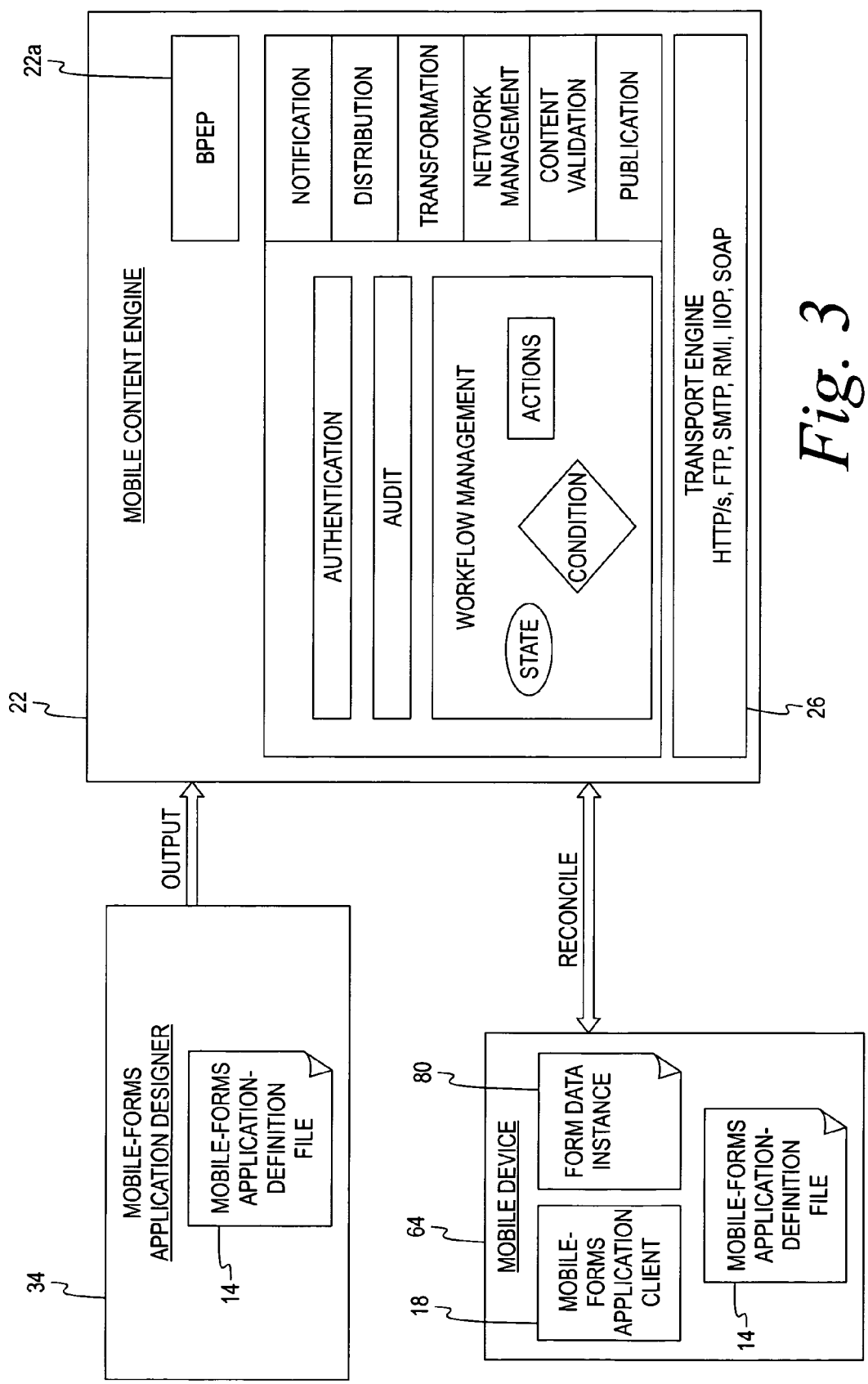
FIG. 3 illustrates a business process engine proxy integrated with a policy-based mobile content engine, according to one embodiment.

Referring also to FIG. 3, the integration of the BPEP 22a with the policy-based mobile content engine 22 is further illustrated, according to one embodiment. A business process workflow is defined in one or more mobile-forms application-definition files 14 that are processed in the policy-based mobile content engine 22 via the BPEP 22a, according to one embodiment. The BPEP 22a is a component of the policy-based mobile content engine 22 that processes mobile forms applications and forms definitions. The mobile-forms application-definition files 14 used by the BPEP 22a can be defined by the non-technical form author using the mobile-forms application designer 34. When utilizing the mobile-forms application designer 34 the form author defines the states, workflow, and composition of the form data instance, the conditions that define the next state to process (e.g., if the technician requires new parts then go to state 'Y'), and the actions to be processed on a given state in the form's data instance life cycle.

For example, the following sample actions are supported by the mobile-forms application designer 34 and are capable of being interpreted by the BPEP 22a and enforced by the policy-based mobile content engine 22: content publication (e.g., add/move/copy/delete document or form data) to an existing/new network folder or other services (This action takes into account the user's access permissions to the document or form data on the targeted destination prior to publishing the content.); content auditing (auditing of user, device, and content information updated via the policy-based mobile content engine 22); content distribution via email, fax, SMS, print and content push via the policy-based mobile content engine 22; content notification via email, fax, SMS, SNMP, SMPP, print, and/or other external web services; content transformation that may contain any other previously defined actions (It is possible to transform the data prior to distributing it via email (e.g., make it a viewable HTML document)); content validation (Some targeted devices might not support local validation against an XML schema. Therefore, the validation can be defined as an action and cause the document to be rerouted to the sender.); and network management (This action can require the sender to publish associated attachments to the data instance on a specific network type (e.g., EDGE/GPRS, UMTS, CDMA 1x, W-CDMA, WiFi, 802.11a/b/g, Bluetooth, LAN, cradle, etc.).).

According to one embodiment, the communication protocol of the content management system 10 utilizes HTTP(S) as the preferred protocol to transport all form data instance and attachments to the Policy-based Mobile Content Engine. The content management system 10 may utilize, as the preferred protocol to distribute and notify other internal or external resources (e.g., users, other machines, etc.), HTTP/HTTPS, SyncML, ActiveSync, SOAP, SMTP, FTP, SMS, SNMP, SMPP, RMI, IIOP, etc. Other communication protocols can be utilized without nullifying the key attributes of the above-described implementation. For example, web extensions such as SOAP and .NET can also be utilized, as well as proprietary communication protocols. The policy-based mobile content engine 22 may also act as an authorizing proxy for each of these protocols that allows the mobile-forms application client 18 to communicate in real time with one or more enterprise content sources 46 hosted behind the enterprise firewall. For example, a drop down list in a mobile form could be dynamically generated by a SOAP request to an enterprise content source 46. The policy-based mobile content engine 22 would apply appropriate policies both before and after routing the SOAP request from the mobile-forms application client 18 onto the enterprise content source 46.

The content management system 10 may utilize Secure Socket Layer (SSL) to encrypt all communication between the clients, other internal and external resources, and the policy-based mobile content engine 22. Other encryption techniques can be utilized without nullifying the key attributes of the invention. For example, a VPN tunnel could be used to secure the connection between the mobile-forms application client 18 and the policy-based mobile content engine 22. Similarly, an s-mime technique could also be adopted where the target application is e-mail. Furthermore, the forms designer can specify that the data captured as an XML document on the mobile device may be encrypted using a public or secret-key cryptosystem (e.g., Kerberos, PKI, etc.) to properly secure the content on the mobile device if the device was stolen or lost, or if the policy-based mobile content engine 22 was compromised.

The content management system 10 enables existing authentication such as existing LDAP and RADIUS servers (local or remote, outside or behind the firewall with support for "single sign on" schemas) among others, to be used by the policy-based mobile content engine 22 to authenticate users of the mobile-forms application client 18, the mobile-application management client 30, and the administration client 42. The policy-based mobile content engine 22 can either automatically detect the required authentication or the policy-based mobile content engine 22 can be told by a system administrator to do so. Authorization providers are used to determine it the client is authorized based on their access permissions determined, but not limited to, the client's role and/or group access permission on the accessed resource (e.g. updating or creating a forms data instance).

The mobile-forms application designer 34 provides the end-user with custom-built form applications available on a thick or thin client. It also enables the forms designer to define all aspects of the mobile-forms application-definition files 14, target mobile devices, associate a test environment where the mobile-forms application-definition files 14 can be tested, associate business workflow, form navigation, behavior, data capture and define how the mobile forms applications can be procured and how they can be distributed, updated, or revoked from privileged users.

The content management system 10 provides superior end user, network, and client performance in several different ways. First, data compression may be used both in downloading newly dispatched and uploading updated form data instances. Furthermore, the policy-based mobile content engine 22 determines when file attachments associated with the mobile form application data instance should be delivered using both the type of network and attachment size. Additionally, the content management system 10 supports external model updates (e.g., customer list, price list, inventory list, etc.). These types of lists typically consist of a large amount of data that should only be updated at given times or when network availability permits. For more time critical updates to the list, byte level differencing and data compression can be used to update the end-users list with the changes rather than the updated list. This can reduce the network data consumption by over 80% depending on the changes made to the list. Byte level differencing is done by transmitting only the changes between the old list and the new list (byte level differences) and by applying those changes as an update to the old list on the mobile device to create the new list on the mobile device. It can also be used to update an attachment to a form data instance.

The content management system 10 provides superior availability to mobile workers by enabling offline form filling when confined to areas with restricted network connectivity and by enabling online, near real time, updates of form data to the server. Further, the content management system 10 helps to ensure that forms application and associated resources (e.g., external lists) are pushed as mandatory items. The content management system 10 controls delivery of captured data instances and forms application on a device based on, but not limited to, network connectivity, time, etc. Near real time or scheduled updates to a mobile-forms application-definition file is enabled by, for example, using byte level differencing and data compression to reduce the size of the markup transported to the mobile device. The content management system 10 further enables automatic calculations, comparisons, enforced fields, data input limitations, mandatory, fields, contextual form behavior, read-only and pre-filling of form data, thus assisting in speeding up data capture and business process completion.

As discussed above, the content management system for mobile forms applications 10 utilizes the mobile forms application markup language. The mobile forms application markup language can be utilized to define a number of enhanced form controls. For example, the mobile forms application markup language can define controls for: viewing the definition of a mobile-forms application-definition file 14 to better group controls and maximize display area of mobile devices with limited viewing area; providing new appearances for repeat line item controls; providing controls to view attachments; providing attributes to determine how an attachment is attached to the data instance (e.g., as a base 64 encoded, binary, or as a URI); providing support to display images; providing support to display links allowing form-view navigation or web page launch; providing a trigger with a background image; providing a toolbar with menu items used as a trigger or a submit XForms element; providing a header definition that allows the grouping of repeated controls used on different views; providing a footer definition that allows the grouping of repeated controls used on different views; and providing toolbar, header, and footer references used in a form-view definition to maximize limited resources on given devices (e.g., PPC). These controls can also be bound to dynamic real-time requests that are routed to enterprise content sources 46, via the policy-based mobile content engine 22.

Figure 4:
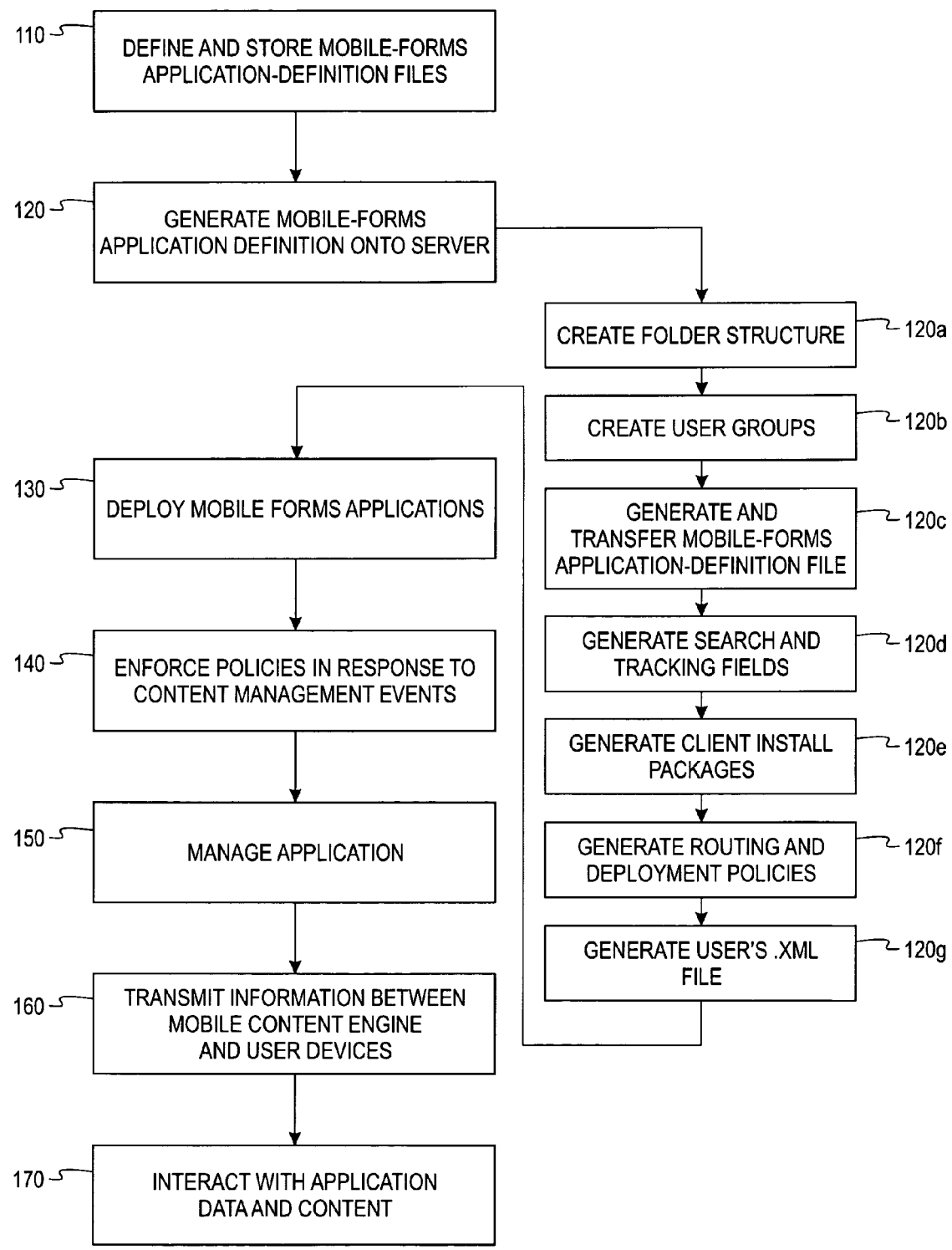
FIG. 4 is an illustration of a process for creating, transmitting, and receiving data via a mobile forms application, according to one embodiment of the present invention.

Turning now to FIG. 4, a process for creating a mobile forms application, transmitting the mobile forms application, and receiving data via the mobile forms application is illustrated, according to one embodiment of the present invention. By utilizing the mobile-forms application designer 34 (FIG. 1), a non-technical user can define a mobile-forms application-definition file 14 (FIG. 1) at step 110. The mobile-forms application-definition file 14 defines the data model, form navigation, form validation, behavior, look and feel for the form application, and the various processing states that a form document will transition through. A mobile policy is also defined which specifies the rules and policies about routing, distribution, notification/alerts, devices, authorization, etc. All of these are created using a wizard-based, point-and-click interface, which requires no coding, scripting or programming on the part of the designer. There are also special tools for defining form based user interfaces that end-users can used to interact with application data, as well as special tools for defining format translations to import and export application data from XML into other formats (HTML, PDF, SQL, CSV, ASCII, etc.) including sending to a printer or fax. And there is a tool for importing, exporting, creating and editing XML schemas that define the structure of the data supported by the mobile-forms application-definition client 18. The mobile-forms application-definition file 14 is then stored to a hard disk.

The application data model, process states, folder structure, user groups, mobile policies, format translations, and user interfaces are all defined in XML-based mobile-forms application-definition files 14 that are generated onto the policy-based mobile content engine 22 at step 120. The policy-based mobile content engine 22 serves as a gateway between mobile forms applications and existing business processes, enterprise content sources, and applications.

The policy-based mobile content engine 22 automatically or manually can be used to create and set up folder structures at step 120*a* and to create user groups at step 120*b*. At step 120*c*, the mobile-forms application-definition file 14 is actually transferred to the policy-based mobile content engine 22. Information contained in the mobile-forms application-definition file 14 is used to define a folder structure in the policy-based mobile content engine 22, which will store the content associated with each application, and to define the user groups in the policy-based mobile content engine 22, that will be allowed to access application data and content during the various processing states of an application instance.

The policy-based mobile content engine 22 generates a plurality of search and tracking fields at step 120*d* that allow a forms manager to look for and monitor the mobile forms applications that have been provided (and deployed) by the policy-based content management engine 22. At step 120*e*, the policy-based content management engine 22 generates client installation packages for installing the mobile form application onto the user devices. Routing and deployment policies are determined at step 120*f* by the policy-based content management engine 22 for the mobile form application based on the mobile-forms application-definition file 14. The policy-based content management engine 22 then generates a user's extensible-markup-language file at step 120*g*.

The mobile forms application created by the mobile-forms application designer 34, is deployed to the user devices at step 130 by the policy-based mobile content engine 22 (FIG. 1) and its associated transport engine 26 (FIG. 1). The deployment activates the mobile forms application such that the application and associated files, user lists, etc. will be pushed down to the user's mobile devices 64 (FIG. 2). Alternatively, the deployment may be accomplished by generating a media card (e.g., a SD card, mini-SD, etc.) along with user configuration files. The media card may then be utilized to automatically and intelligently install the mobile forms application and configuration files onto an OS-enabled user device. The deployment process manages both forms application upgrades as well as data migration that may be required for existing form instances persistent on the policy-based mobile content engine 22 and mobile devices.

The mobile-forms application client 18 (FIG. 1) is available on a wide variety of user devices (PC, Laptop, Tablet, PDA, Blackberry, Smartphone, Browser-based thin-client, etc.) that allows end-users to interact with application data and content. The mobile-application management client 30 (FIG. 1) is also available which allows managers to create, assign, and monitor application instances. Document translators 38 (FIG. 1) are used to view and print application data content, as well as transform it for use by other systems.

The policies of the mobile content engine are applied in response to any content management event (including, but not limited to reconcile requests from clients, new or updated files, files assigned to users, etc.). Policies are able to leverage whatever information is available to the content management engine time in deciding what actions should occur (type of network, content or state of the files being transferred, users involved etc.). In particular, when a relevant state change is detected by the mobile application client 18 on a mobile device 64 (FIG. 2), the policy-based mobile content engine 22 is notified, and the policies for the particular mobile-forms application-definition file 14 are enforced at step 140. The state change may be, for example, the creation or modification of a form data instance 80 (FIG. 2) on the mobile device 64. The mobile-application management client 30 can be utilized at step 150 to create new form data instances and assign them to users (both actions will result in content management events that trigger the appropriate policies for the mobile forms application). Further, at step 150, the mobile-application management client 30 can be utilized to track the status of all data instances (e.g., what state they are in, who they are assigned to) using the search and tracking fields generated at step 120*d*.

Based on the policies relevant to the state change, the new or modified data instance can be transferred between the policy-based mobile content engine 22 and the user devices at step 160. This information can further be transferred between the policy-based mobile content engine 22 and the other user devices within the particular user group. The user or other users are then capable of interacting with the application data and content at step 170 once that information has been pushed to their user device by the policy-based mobile content engine 22.

This scenario is much more effective compared to other solutions that use data replication to synchronize databases on mobile devices with a central server database. First, such databases quickly become too big in practice given the limited capabilities of mobile devices. Second, a lot of unnecessary information is moved back and forth. Policy-driven mobile forms applications are designed to minimize the exchange of data wirelessly (use right network at the right time, compression, byte-level differencing, check-point restart, caching and queuing of requests, automatic and manual client/server interactions, etc.).

While the present invention has been described with reference to one or more particular embodiments, those skilled in the art will recognize that many changes may be made thereto without departing from the spirit and scope of the present invention. Each of these embodiments and obvious variations thereof is contemplated as falling within the scope of the claimed invention, which is set forth in the following claims.

What is claimed is:

1. A system for capturing data via an extensible markup language form, comprising:
   a data input device for receiving one or more mobile-form application definition files;
   a memory storage device storing the one or more mobile-form application definition files;
   a policy-based mobile content engine operated on a controller adapted to process a plurality of mobile-forms application definitions from one or more mobile-forms application definition files, the policy-based mobile content engine being adapted to translate the plurality of mobile-forms application definitions into policies and actions, the policy-based mobile content engine being adapted to enforce the policies and actions that have been translated;
   a mobile-forms application client having a plurality of rendering engines each targeted for a different type of mobile user device, the rendering engines utilizing a forms application definition markup language to render form controls and to process the forms-based application based on the different type of mobile user device, the mobile-forms application client being operable on the different types of mobile user devices and being adapted to capture the data, as one or more form data instances, both online or offline as an extensible-markup-language document, the mobile-forms application client residing on a first mobile user device; and
   a transport engine adapted to transmit mobile-forms applications, and definition files through a transport layer over an intermittent network during periods of intermittent network connections between the policy-based mobile content engine and the mobile-forms application client, wherein the first mobile user device creates a mobile-form data instance with captured data and the transport engine sends the mobile-form data instance to a second device in a routing sequence in accordance with the policies and actions.

2. The system of claim 1, wherein the mobile-forms application client is further adapted to capture and attach a wide variety of multi-media content to the captured data.

3. The system of claim 1, wherein the plurality of rendering engines of the mobile-forms application client is adapted to encode the captured data as an extensible-markup-language form data instance.

4. The system of claim 1, wherein the plurality of rendering engines of the mobile-forms application client is adapted to reference the inputted data to an opaque object.

5. The system of claim 1, wherein the management and distribution of the captured data is controlled by one or more policies translated from the plurality of mobile-forms application definitions.

6. The system of claim 1, wherein the rendered form controls are linked to and interact with one or more input devices provided on the mobile user device, the one or more input devices allowing for data capture and assisting with navigation of the forms-based application.

7. The system of claim 1, wherein the policy-based mobile content engine sends notifications as one or more data fields within the mobile-forms application definition files is updated.

8. The system of claim 1, wherein the policy-based mobile content engine supports multiple security domains in a hosted environment enabling mobile forms applications, folder structures, user groups, user authentication, policies, and form data instances, to be partitioned and kept wholly separate by security domain.

9. The system of claim 1, wherein the transport engine utilizes data compression to transmit the mobile-forms application definition files and the captured data through the transport layer between the policy-based mobile content engine and the mobile-forms application client.

10. The system of claim 1, wherein the transport engine utilizes byte-level differencing when retransmitting or updating large files that are part of the mobile-forms application through the transport layer between the policy-based mobile content engine and the mobile-forms application client.

11. The system of claim 1, wherein the transport engine utilizes check-point restarting when transmit the mobile-forms application definition files and the captured data through the transport layer between the policy-based mobile content engine and the mobile-forms application client.

12. The system of claim 1, wherein the transport engine uses caching and queuing of requests for transmitting the mobile-forms application definition files and the captured data through the transport layer between the policy-based mobile content engine and the mobile-forms application client.

13. The system of claim 1, wherein the transport engine supports communication between the mobile-forms application client and the policy-based mobile content engine both inside and outside of a corporate firewall.

14. The system of claim 1, wherein the transport engine maintains a secure and robust user session between the mobile-forms application client and the policy-based mobile content engine over the intermittently connected network, via file caching, partial file transmission support, and a robust synchronization protocol.

15. The system of claim 1, wherein the rendered form controls are linked to and interact with one or more enterprise content sources in real-time, a request to the one or more enterprise content sources being communicated either directly or via the policy-based mobile content engine.

16. A method for defining and enforcing automatic routing rules to define a business process workflow for enterprise mobile applications, the workflow including routing and integrating form data across multiple client devices across an enterprise including the multiple client devices and an enterprise content source, comprising:

defining, via a mobile-forms application designer, a mobile-forms application-definition file that defines a mobile forms application by providing, (i) a mobile forms application definition markup language, (ii) an extensible-markup-language-based policy model that applies to one or more data instances created by a first client device that are to be automatically managed via access and routing states and specifies the business process workflow including state attributes for devices and events triggered by a change in state resulting in the routing of the data instance to a second client device, (iii) role information specifying one or more targeted user groups to deploy the mobile-forms application-definition file and the associated data instances based on access and routing states, and (iv) a transport engine to distribute of the forms-based application to the targeted user groups;

determining the automatic routing rules for the business process workflow by reading, via a business process engine proxy, the mobile-forms application-definition file for the specified routing information and associated extensible-markup-language-based policy model; and enforcing, via a policy-based content management engine, the routing rules determined based on the mobile-forms application-definition file, wherein the deployment, form interaction, routing, and management of the mobile forms application is automatically performed by the policy-based content management engine based on the policy model defined by the mobile-forms application-definition file; and wherein the routing includes using the transport engine to transmit mobile-forms applications and definition files through a transport layer over an intermittent network during periods of intermittent network connections between the first client device and the second client device in accordance with the policy model.

17. The method of claim 16, wherein the business process workflow includes (i) definition of the state attributes in terms of information contained in a mobile-forms application instance or information available at run time in the policy-based mobile content engine, (ii) conditional evaluation and responses to events, and (iii) actions that can be processed either directly or via the policy-based mobile content engine, the actions including changing the state of the mobile-forms application client.

18. The method of claim 16 further comprising, allowing a manager to track the progress of a work request relative to the business process workflow by utilizing a mobile application manager client, the business process engine proxy, and the policy-based content management engine.

19. The method of claim 16 further comprising, sending dynamic alerts and notifications associated with a tracked business process workflow and other events.

20. The method of claim 16, wherein the mobile forms application designer is adapted to modify the mobile-forms application-definition file.

21. The method of claim 16, wherein the mobile forms application designer is adapted to modify the extensible-markup-language-based policy model.

22. The method of claim 16, wherein the mobile forms application designer is adapted to test and package a mobile-forms application-definition file and the mobile-forms application-definition file's dependencies.

23. The method of claim 16, wherein the mobile-forms application-definition file is a self-extractable packaged file.

24. The method of claim 16 further comprising, updating the mobile-forms application-definition file and providing the updated mobile-forms application-definition file to the mobile user device, via the policy-based content management engine and the associated transport engine.

25. The method of claim 24, wherein the updated mobile-forms application-definition file is provided to the mobile user device utilizing wireless network connectivity.

26. The method of claim 24, wherein a form instance data definition modification can trigger data migration of existing form data instances persistent on the policy-based content management engine and the mobile user devices to validate against a new forms instance data definition via the business process workflow.

27. The method of claim 16 further comprising, mapping, via one or more translators, the mobile forms application from the extensible forms language into a format preferred by a user.

28. The method of claim 16 further comprising, mapping, via one or more translators, the mobile forms application from the extensible forms language into a format appropriate for the mobile user device the mobile forms application is deployed on.

29. A method for recognizing data superimposed on a paper form comprising:
    scanning a paper based form to create a paper-based form template;
    capturing the location of a form data instance element overlaid on the paper-based form template;
    capturing the size of a form data instance element overlaid on the paper-based form template;
    creating an input field based on the location and size of the form data instance element;
    linking the paper-based form template to an application data model;
    populating the paper-based form template with mobile-forms application data for a specific data instance in the input field;
    associating policies and actions to the paper-based form template to define workflow information; and
    automatically routing the paper-based form template to multiple devices in an enterprise in accordance with the policies and actions defined by the workflow information, the routing including using a transport engine to transmit the form template through a transport layer over an intermittent network during periods of intermittent network connections between the multiple devices in accordance with the policies and actions.

30. The method of claim 29, wherein the input field can be changed from a generic input field to a form controlled field.

31. The method of claim 30, wherein the form controlled field is a date picker.

32. The method of claim 30, wherein the form controlled field is a signature control.

33. A system for capturing data via an extensible markup language form, comprising:
    a data input device for receiving one or more mobile-form application definition files;
    a memory storage device storing the one or more mobile-form application definition files;
    a policy-based mobile content engine operated on a controller adapted to process a plurality of mobile-forms application definitions from one or more mobile-forms application definition files, the policy-based mobile content engine being adapted to translate the plurality of mobile-forms application definitions into policies and actions, the policy-based mobile content engine being adapted to enforce the policies and actions that have been translated;
    a mobile-forms application client residing on a first mobile user device having a plurality of rendering engines each targeted for a different type of mobile user device, the rendering engines utilizing a forms application definition markup language to render form controls and to process the forms-based application based on multi-media hardware of the different types of mobile user device, the mobile-forms application client being operable on the different types of mobile user devices and being adapted to capture the data in multi-media formats using the multi-media hardware on the mobile user devices, as one or more form data instances, both online or offline as an extensible-markup-language document; and
    a transport engine adapted to transport mobile-forms applications, and definition files through a transport layer over an intermittent network during periods of intermittent network connections between the policy-based mobile content engine and the mobile-forms application client, wherein the first mobile user device creates a mobile-form data instance with captured data and the transport engine sends the mobile-form data instance to a second device in a routing sequence in accordance with the policies and actions.

\* \* \* \* \*